United States Patent [19]

Meyer

[11] Patent Number: 4,716,465

[45] Date of Patent: Dec. 29, 1987

[54] DEVICE FOR WIRELESS VIDEO MONITORING AND CONTROL OF A STILL CAMERA

[76] Inventor: Peter Meyer, 1213 Talley Rd., Wilmington, Del. 19809

[21] Appl. No.: 898,367

[22] Filed: Aug. 20, 1986

[51] Int. Cl.[4] .............................................. H04N 5/232
[52] U.S. Cl. ....................................... 358/210; 358/224
[58] Field of Search ............... 358/210, 224, 225, 909, 358/213.13, 227, 228

[56] References Cited

U.S. PATENT DOCUMENTS

| | | | |
|---|---|---|---|
| 3,435,136 | 3/1969 | Bachmann | 358/224 |
| 4,225,886 | 9/1980 | Smith | 358/210 |
| 4,303,322 | 12/1981 | Someya | 358/909 |
| 4,518,239 | 5/1985 | Tomori | 358/225 |
| 4,527,205 | 7/1985 | Konishi | 358/909 |
| 4,541,016 | 9/1985 | Ochi | 358/909 |
| 4,567,535 | 1/1986 | Kinjo | 358/909 |

Primary Examiner—Michael A. Masinick
Attorney, Agent, or Firm—Barbara C. Siegell; Robert S. Lipton; Robert B. Famiglio

[57] ABSTRACT

A combination device for wireless video monitoring and remote control of a still camera is disclosed. In operation, the device includes a television camera that is positioned so as to photograph through the view finder of a camera. The image photographed is transmitted electronically to a video receiving means located at a remote distance from the camera. The camera lens and the means for vertical and horizontal positioning of the still camera are connected by servo motor means to a means for receiving control signals. The control signals control the focusing of the lens and horizontal or vertical position of the camera. A transmitting device located at the site of the video receiving means, transmits control signals for directing the servo motor means to move the camera's lens or change the camera's position.

13 Claims, 1 Drawing Figure

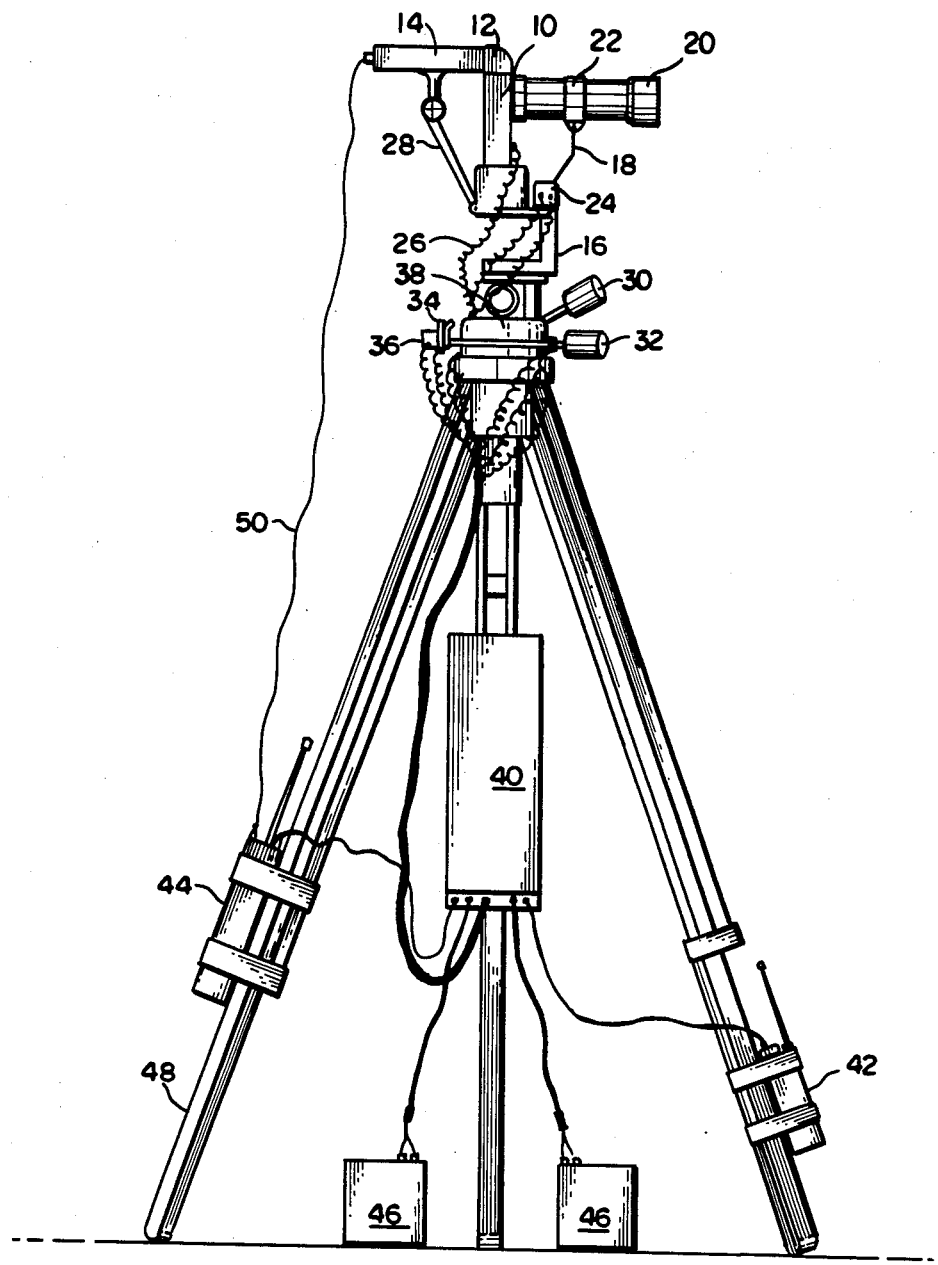

DEVICE FOR WIRELESS VIDEO MONITORING AND CONTROL OF A STILL CAMERA

BACKGROUND OF THE INVENTION

1. Field of the Invention

This invention relates to a combination of a video receiving means for receiving an image as seen from the view finder of a "still" camera located a distance away and a wireless controlling device for permitting the user of the invention to control all the moving parts of the camera and the platform supporting the camera from a remote distance.

Accordingly, the primary object of the present invention is to provide a wireless remote control video monitoring device for controlling the focus, position, shutter and other moving parts of a still camera.

A further object of the present invention is to provide a video monitor capable of receiving images that are seen from the view finder of a still camera.

A still further object of the present invention is to provide a wireless remote control means for transmitting directions to a receiver which in turn transmits directions to a control means for servo motors which move the focusing parts of a still camera and which control the horizontal and vertical positions of the still camera.

These and other objects will become apparent from a consideration of the description of a preferred embodiment and from the drawings and appended claims.

2. Description of the Prior Art

In the field of still camera use, it is known to use timing devices to set a photographic shutter, where a camera has been focused in advance, so that a photographer may take his picture while he is at a remote location. There are other devices that allow the photographer to take a photograph from a distance where a cable is connected to a shutter. In these cases, the distance at which a photographer may be located is limited either by the timing of the shutter controlling device or the length of the cable connecting the controls with the camera.

Various means have been used to overcome the above disadvantages. U.S. Pat. No. 3,805,281, by Narita et al., uses a tripod equipped with a receiver for receiving a radio signal generated by a transmitter and transmitting the radio signal received to a shutter releasing means to take a picture from a remote distance. U.S. Pat. No. 3,686,672, by Ishizuka, also teaches a radio control system for remotely and wirelessly controlling the shutter operation of a camera. While these radio controlled devices were an improvement over the timer and cable controlled picture taking systems, they suffer from the disadvantage of not allowing the photographer to see the image through the camera's lens, of not allowing the photographer to focus the camera from a distance and of not allowing the photographer to move the camera or its parts while viewing the photographic subject matter from a distance. The present invention overcomes these limitations by providing a method for using a combination and the combination apparatus itself for wireless video monitoring and control of a still camera. Using the device disclosed by the instant invention, the photographer can remain at a distant location miles away from the photographic invention and control all the moving parts of the camera and the positioning supports for the camera that have been connected for remote control.

SUMMARY OF THE INVENTION

The present device is an improved remote control device for wireless video monitoring of a still camera. The invention includes the combination of a camera which has a view finder on one side and a lens on the other, supported by a "fluid head" type of tripod or other support structure that permits vertical and horizontal positioning of the camera. The movement of the lens for focusing of the camera and the positioning of the camera are accomplished by means of servo motors controlled by a control means that is connected to a receiver for receiving remote control signals generated by a microwave or other short wave signal controlled at a distant location from the described camera and appendages.

A television camera is positioned so that it is adequately supported and has its lens in communication with the view finder of the camera. The signal generated by the television camera is transmitted by means of a transmitter to a television video receiver located at a remote distance from the television camera. When a photographer is at a location which he can view the picture generated at the video receiver and where he can control the transmitting device, he can use the control means to position and focus the camera while he is able to view the image to be photographed on the video receiver, before he takes a picture.

Both the transmitting device for generating the remote control signal and the receiving device which is located at the camera's location can be controlled by computers that can be programmed.

BRIEF DESCRIPTION OF THE DRAWING

The drawing is a front elevation view showing one embodiment of the invention having a tripod as a means of support and showing the relationship between the components of the invention.

DESCRIPTION

A camera 10 is mounted on a "stroboframe" 16 that allows a camera to shoot vertically as well as horizontally. The "stroboframe" 16 is attached to a "fluid head" 38 of tripod 48 for permitting movement in appropriate directions when the servomotors 30 and 32 receive a proper signal. A television camera 14 is mounted so that it is able to photograph through the view finder 12 of the camera 10. Arm 28 supports the television camera 14 in its position in communication with the view finder 12. A lens 20 is attached to the camera by means of suitable fittings. A ring 22 connects the lens 20 by means of arm 18, to servo motor 24 that moves the lens in focusing positions.

The television camera is connected by means of connecting wire 50 to a transmitter 44 attached to a tripod 48 or other support means, used to support and position the camera.

There is a means for remote shutter control at 26 that is connected to control box 40. Speed control means at 34 and 36 control the speeds of the servo motors. The speed control devices are pre-set at fast or slow speeds.

Also located on the tripod 48, or other support means is a control means 40 and a receiver means 42. A power generating means, such as a single battery or a plurality of batteries 46, may be used to provide power for the control means 40.

At a remote distance from the camera and related structure pictured, is a conventional television video receiver (not shown) and a microwave or other high frequency transmitter (also not shown). The video receiver allows the photographer to see the image from a remote distance. The photographer then transmits signals, by means of the microwave or other high frequency transmitter to the receiver means 42 which are then communicated to the control means 40 for directing movements of the servo motor 30, 32 and 24.

In operation, the television camera 14 is positioned so that it photographs through the view finder 12 of the camera 10. The image produced is transmitted electronically via transmitter 44 to a remotely located video receiving means (not shown). The user of the combination is thus able to view the photographic scene. The camera is moved horizontally and vertically by servomotors located at 30 and 32 that are activated by signals received at receiver means 42 and transmitted to control means 40. The camera is focused by movement of lens 20 by means of servo motor 24. The signals received are generated by the signal transmitting means located in proximity to the video receiving means. A photographer located at a remote site from the camera can, thus, view the image that he will be photographing while having complete remote control of the positioning, focusing and shutter of his camera.

Although the present invention has been described with reference to the particular embodiment herein set forth, it is to be understood that the present disclosure has been made only by way of example and that numerous changes in details of construction may be resorted to without departing from the spirit and scope of the invention. Thus, the scope of the invention should not be limited by the foregoing specification, but rather only by the scope of the claims that are appended hereto.

What is claimed:

1. A method for video monitoring and control of a still camera comprising the steps of:
    (a) mounting a still camera, that has a viewfinder and a lens, a shutter means and is on a support means that permits vertical and horizontal movement;
    (b) connecting the lens of said still camera to a servo motor device;
    (c) connecting servo motors to the support means that permits vertical and horizontal movement and to the lens;
    (d) connecting a control means to said servo motors;
    (e) further connecting said control means to a receiver means for receiving transmitted control signals;
    (f) mounting a television camera to the viewfinder of said camera;
    (g) connecting said television camera to a transmitting device for transmitting an electronic signal to a video receiving device;
    (h) transmitting control signals to said receiver means by means of a remotely located short wave transmitting device at the same time that the person transmitting the signals is able to view the image seen on the video receiving device;
    (i) using a power generating means for supplying power to the control means;
    (j) connecting said television transmitter and receiving means to said control means; and
    (k) controlling the shutter means electronically and by remote control.

2. The method of claim 1 wherein the support means for vertically and horizontally moving the camera is a "fluid head" tripod.

3. The method of claim 2 wherein the means for transmitting remote control signals to the receiving means located at the camera location is a computer controlled transmitter that has the capacity to be programmed.

4. The method of claim 3 wherein the receiver of step (e) is an F.M. receiver that is computer controlled and that can be programmed.

5. The method of claim 4 wherein the power generating means for supplying the power to the control means is one or more 12 volt batteries.

6. An apparatus for video monitoring and control of a still camera comprising:
    (a) a camera means having a viewfinder, a shutter and a lens;
    (b) a television camera adapted to attach to the viewfinder of said camera;
    (c) a means for electronically controlling the horizontal and vertical position of said camera;
    (d) a means for electronically controlling the focusing of said lens;
    (e) a means for electronically controlling the shutter of the camera;
    (f) a means for transmitting a video image of the view through the view finder to a television screen located at a remote distance away from the camera;
    (g) a means for transmitting directions to the electronic control devices for controlling the horizontal and vertical positions, shutter and focusing of the camera from the same remote distance where the television screen is located;
    (h) a means for receiving the control directions at the cameras location;
    (i) a controller means for converting the control directions received to a form that can be used to control the electronic means for controlling the position, shutter and focusing of said camera; and
    (j) a power source means for powering the electronic combination at the camera location.

7. The apparatus of claim 6 wherein the means for controlling the vertical and horizontal camera position is a "fluid head" tripod connected to a servo motor control means.

8. The apparatus of claim 7 wherein the means for controlling the focusing of the lens is a servo motor.

9. The apparatus of claim 8 wherein the power source means is a single battery or a plurality of twelve volt batteries.

10. The apparatus of claim 9 wherein the means for receiving the control directions is an "F.M." receiver.

11. The apparatus of claim 10 wherein the means for transmitting directions for the electronic control devices from a remote location is a microwave transmitter.

12. The apparatus of claim 11 wherein the microwave transmitter means is computer controlled and programable.

13. The apparatus of claim 10 wherein the F.M. receiver is computer controlled and programmable.

* * * * *